United States Patent [19]
Lioio et al.

[11] Patent Number: 5,724,047
[45] Date of Patent: Mar. 3, 1998

[54] PHASE AND TIME-DIFFERENCE PRECISION DIRECTION FINDING SYSTEM

[75] Inventors: Rick J. Lioio, Redondo Beach; Gary E. Clayton, Torrance; Robert A. Deaton, Los Angeles, all of Calif.

[73] Assignee: Hughes Electronics, Los Angeles, Calif.

[21] Appl. No.: 758,038

[22] Filed: Nov. 27, 1996

[51] Int. Cl.[6] ........................................ G01S 5/04
[52] U.S. Cl. .................. 342/442; 342/56; 342/417; 342/424
[58] Field of Search ...................... 342/56, 417, 420, 342/424, 442

[56] References Cited

U.S. PATENT DOCUMENTS

| | | | |
|---|---|---|---|
| 4,638,321 | 1/1987 | Drogin | 342/444 |
| 4,888,593 | 12/1989 | Friedman et al. | 342/387 |
| 5,285,209 | 2/1994 | Sharpin et al. | 342/424 |
| 5,541,608 | 7/1996 | Murphy et al. | 342/442 |
| 5,568,154 | 10/1996 | Cohen | 342/443 |
| 5,608,411 | 3/1997 | Rose | 342/417 |

*Primary Examiner*—Thomas H. Tarcza
*Assistant Examiner*—Dao L. Phan
*Attorney, Agent, or Firm*—Leonard A. Alkov; Wanda K. Denson-Low

[57] ABSTRACT

A precision direction finding system for making precision angle of arrival estimates for a signal received through two antenna elements separated in space. Phase interferometry is used to determine a precise angle of arrival, with multiple ambiguities due to the periodic nature of the phase difference related to geometric angle. The interferometric ambiguities are resolved using the time difference of arrival (TDOA) of the signal at the two antenna elements. TDOA is measured using leading edge envelope detection for simple pulsed signals, and predetection correlation for phase and frequency modulated signals.

14 Claims, 3 Drawing Sheets

PHASE AND TIME-DIFFERENCE PRECISION DIRECTION FINDING SYSTEM

TECHNICAL FIELD OF THE INVENTION

This invention relates to direction finding systems employing phase and time difference measurements of a signal received through two antenna elements separated in space, and more particularly to a system which combines time and phase difference measurements to eliminate ambiguities caused by the periodic nature of the phase difference related to geometric angle.

BACKGROUND OF THE INVENTION

In general, interferometry is capable of high precision angle of arrival (AOA) measurements with less than 1 degree error, but the angle measurement has multiple ambiguities caused by the periodic nature of the phase difference related to the geometric angle. It is impossible to achieve unambiguous high precision angle measurements and reasonable frequency coverage using a single baseline (two element) interferometer. Conventionally, multiple interferometer baselines must be used to resolve the ambiguities, known as multiple baseline interferometry (MBI). Disadvantages of MBI are that it requires the space to install multiple antennas, preferably in a coplanar geometry, and it requires extra antenna elements and receiver electronics to process the multiple baseline signals. Time Difference of Arrival (TDOA) covers 180 degrees unambiguously since time delay between two antennas is monotonic with respect to geometric angle, but it is difficult to achieve high precision without a high Signal-to-Noise ratio (SNR) which results in reduced sensitivity.

Another known direction finding technique is known as phase rate of change (PRC) passive location. The disadvantage of PRC is that it requires an aircraft to subtend a significant angle with respect to an emitter over a period of time in order to estimate range and location.

A long interferometer baseline (greater than 10 meters) is needed to obtain precision angle measurements for VHF and UHF frequencies (50 MHz to 200 MHz). On an aircraft, the best antenna locations are at the extreme ends of the wing, tail and fuselage since these locations allow the simplest physical installation, provide the best unobstructed Field of View (FOV) and have multiple multi-path effects. It is very difficult to find suitable locations for coplanar smaller baseline arrays which would allow simple resolution of the ambiguities using multiple phase measurements.

This invention eliminates the need for multiple baselines, and allows unambiguous high accuracy AOA measurements to be made over more than two octaves of frequency range using only a single pair of elements.

SUMMARY OF THE INVENTION

A precision direction finding system is described, which is responsive to RF signals for determining a precise estimate of an angle of arrival (AOA) of the RF signal relative to a system antenna array. The system includes first and second antenna elements separated in space, and a receiver and processing apparatus responsive to first and second signals received at the first and second antenna elements. This apparatus determines a frequency of the received signals, a phase difference between corresponding phases of the first and second signals, and time difference of arrival (TDOA) values of the first and second signals at the respective first and second antenna elements.

The system further includes angle calculation apparatus responsive to the phase difference and frequency values for performing a phase interferometry determination of a set of multiple ambiguous estimates of the AOA. The angle calculation apparatus further performs a TDOA angle calculation to provide a coarse estimate of the AOA, and selects as a precision estimate of the AOA that ambiguous estimate of the phase interferometry determination which is closest to the coarse estimate.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

In accordance with the invention, interferometric ambiguities are resolved using the time difference of arrival of the signal at the two antennas. TDOA is measured using leading edge envelope detection for simple pulsed signals, and pre-detection correlation for phase and frequency modulated signals. The combination of interferometric and TDOA techniques allows unambiguous precision angle measurements to be made over more than two octaves of frequency with only one pair of elements which, when combined with suitable processing, enables Precision Direction Finding and Passive Location to be performed for a large number of emitters.

The technique can be applied to different types of waveforms, encompassing a large number of emitters. The basic requirement is that there be a sufficient number of measurable time domain events in the signal waveform within a time period reasonably small with respect to ownship velocity and compatible with a typical receiver look window, about 20 ms. Time domain events can be any form of discrete modulation including pulse modulation, PSK and FSK. The simplest case is pulse modulation since TDOA can be measured using simple envelope detection and TOA sampling techniques. The other forms of modulation require a more general I/Q sampling of the predetection waveform and use of correlation processing to define DTOA.

Figure 1:
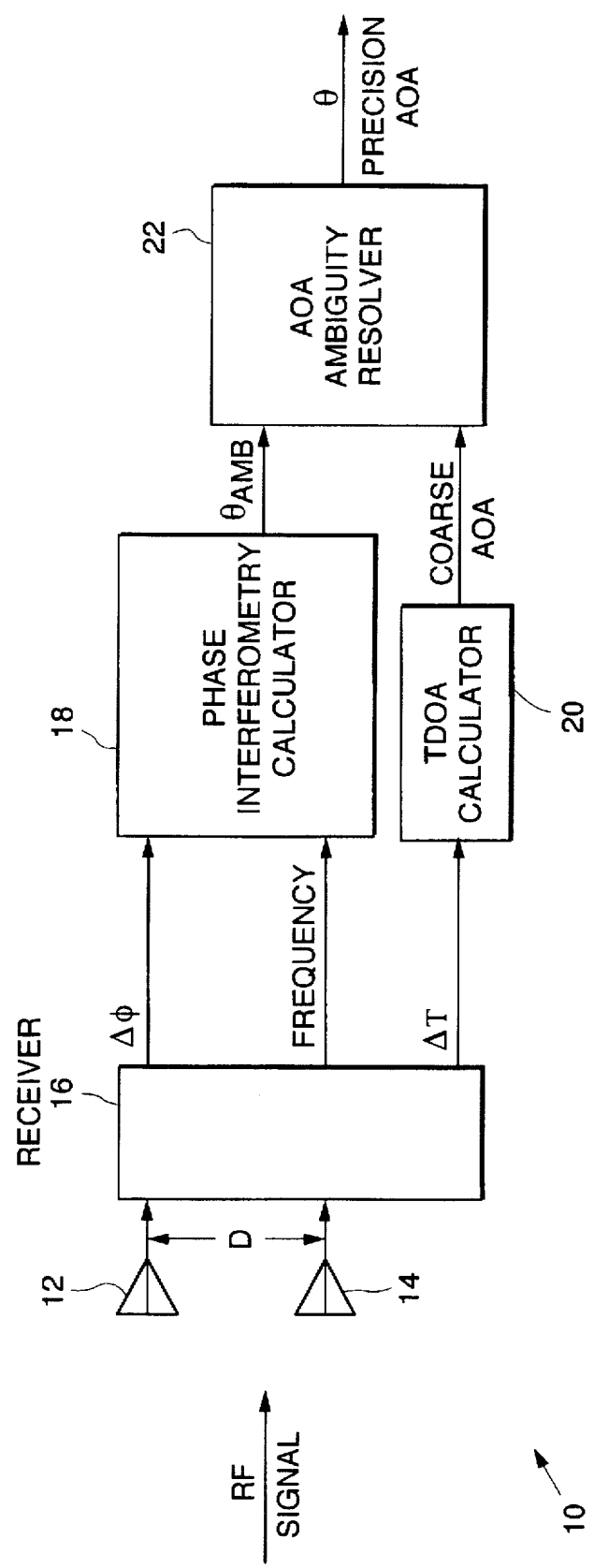
FIG. 1 is a functional block diagram of a direction finding system embodying the present invention.

FIG. 1 is a generalized functional block diagram of a direction finding system 10 embodying the invention, for providing a precision estimate of the angle of arrival of an RF signal incident on the antenna array. The system employs two antenna elements 12, 14 separated by a distance D. The signals received at the antenna elements are processed by a receiver 16, which determines from the respective signal components received at the elements the phase difference $\Delta\phi$, the time difference in arrival ($\Delta T$), and the frequency of the arriving signal. The $\Delta\phi$ and frequency information is employed by a phase interferometer calculator 18 to calculate the ambiguous fine angle of arrival (AOA). The ΔT data is employed by a time difference of arrival calculator 20 to calculate a coarse AOA value. The ambiguous fine AOA and the coarse AOA are fed to an AOA ambiguity resolver 22, which selects from the set of ambiguous fine AOA values that value which is closest to the coarse AOA value as the precision AOA value for the system.

Figure 2:
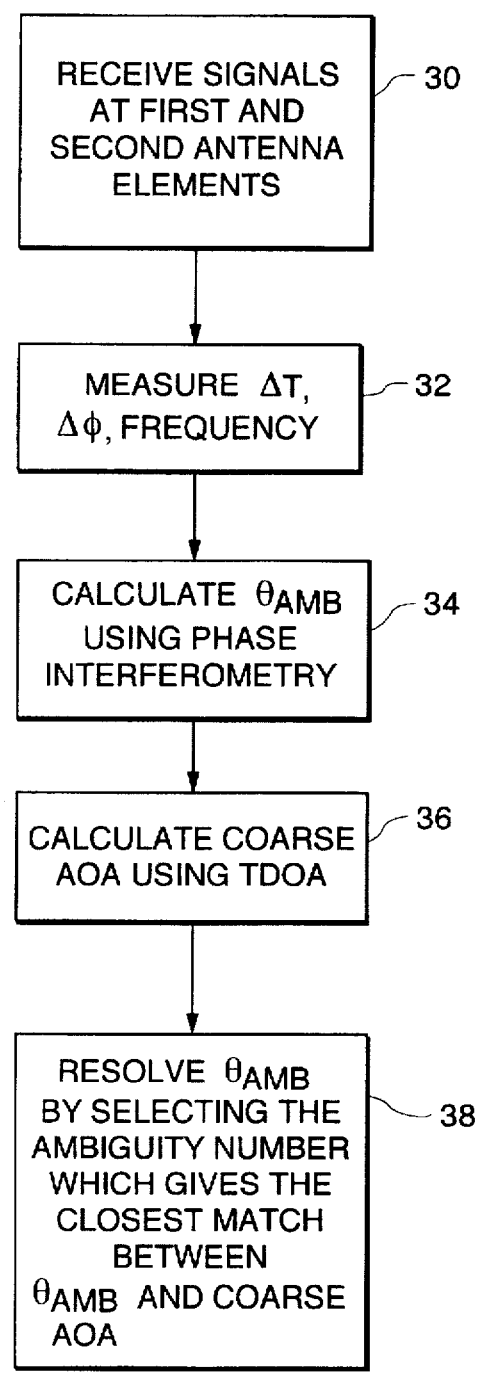
FIG. 2 is a flow diagram of a precision direction finding method in accordance with the invention.

FIG. 2 is a simplified flow diagram illustrating the method of calculating the precision value of the AOA in accordance with the invention. At step 30, the signals are received at the two antenna elements. The receiver then measures the ΔT, Δϕ and frequency values for the signal incident on the two antenna elements (step 32). At step 34, the phase interferometer calculator determines the ambiguous set of AOA values $\theta_{AMB}$. At step 36, the TDOA calculator determines the coarse value of the AOA. The ambiguous values of the AOA are resolved, by selecting the ambiguity number which gives the closest match between $\theta_{AMB}$ and the coarse AOA as the precision AOA value determined for the system (step 38)

Figure 3:
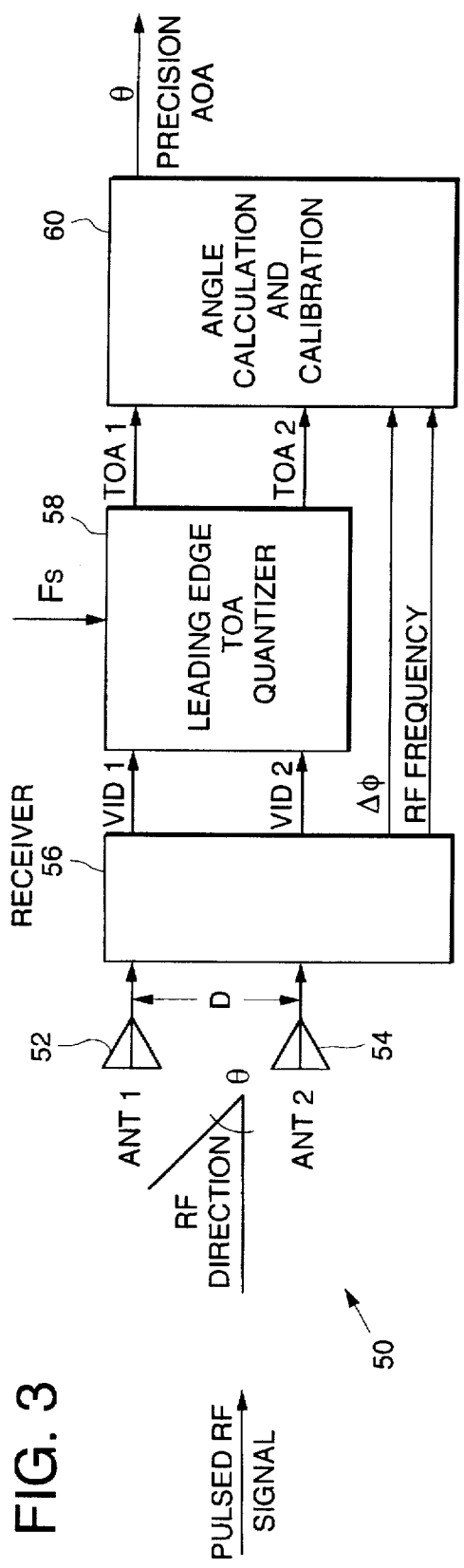
FIG. 3 is a schematic block diagram of a first exemplary embodiment of a phase-TDOA precision direction finding system embodying the invention, and utilizing responses to pulsed signals.

FIG. 3 is a schematic block diagram of a first embodiment of a phase-TDOA precision direction finding system 50 embodying the invention, and utilizing responses to pulsed signals. The system includes a pair of antennas 52, 54 separated by a distance D, feeding a two channel receiver 56 which makes calibrated measurements of the phase difference between the signals in the two channels, measures their frequency, and generates the detected video envelopes of the two signals. The detected video envelopes are processed by a leading edge quantizer 58 which accurately finds the Time of Arrival of the leading edge of each signal, referenced to the peak amplitude of the signal, and then quantizes the TOAs to a common time reference by sampling it at rate Fs.

The digitized frequency, phase difference and TOAs of the signals in each channel are fed to a processor 60 which calculates "coarse" AOA from the time difference between the leading edges using the following formula:

$$\theta = \sin^{-1}(\Delta T c / D) \quad (1)$$

The equation for $\sigma_\theta$, the angle-of-arrival estimate error from time of arrival (TOA), is $$\sigma_\theta = (c\, \sigma_{TOA} \sqrt{2})/D\cos\theta \sqrt{N_{\Delta TOA}} \quad (2)$$

where D is the baseline length, c is the speed of light, N is the number of measurements made, ΔT is the difference between the TOA measurements and $\sigma_{TOA}$ is the TOA measurement error. The TOA measurement error is dominated by two components, quantization error and noise.

$$\sigma_{TOA\, noise} = \frac{\tau}{\sqrt{2 SNR_{video}}};$$

$$\sigma_{TOA\, quantization} = \frac{Sample Period}{\sqrt{12}}$$

where Sample Period is 1/Fs and τ is 1/[receiver detection bandwidth]. The interferometric angle ambiguity should be set to about 3 $\sigma_{74}$ to keep the ambiguity error rate very small.

Ambiguous "fine" AOA is calculated from the phase difference between the two channels using the following formula $$\theta_{amb} = \arcsin\left[\frac{(\phi + 2\pi m)\lambda}{2\pi D}\right]$$

where m is the ambiguity number and λ is the wavelength.

The first and smallest AOA ambiguity is given by:

$$Amb_i = 2\arctan\left(\frac{\lambda}{2D}\right)$$

The "fine" AOA ambiguity is resolved by selecting the measurement which is closest to the "coarse" AOA measurement resulting from the TDOA. The coarse and fine measurement accuracies are selected so that the ambiguities of the fine measurement are greater than the 3 sigma error of the coarse measurement, guaranteeing an ambiguity error rate less than 0.5%. The final result is the unambiguous precision AOA for the received signal.

Figure 4:
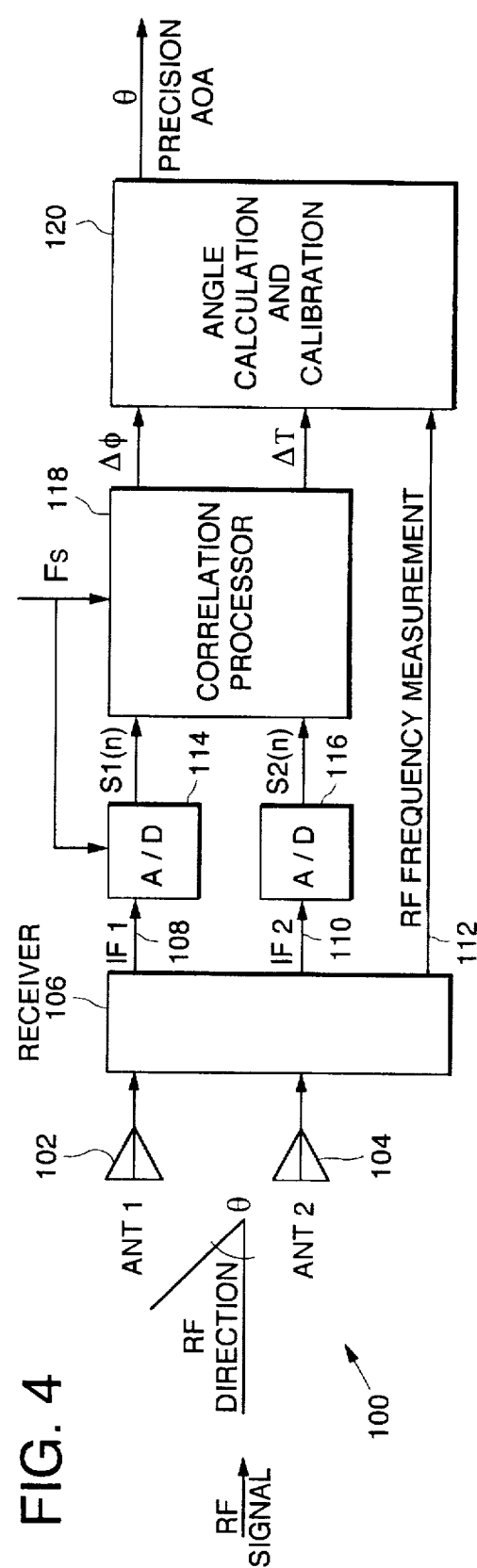
FIG. 4 is a schematic block diagram of a second embodiment of a system employing the invention.

FIG. 4 is a schematic block diagram of a second embodiment of a system employing this invention. The system 100 of FIG. 4 is also capable of processing pulsed signals, but is a more general system for PSK and FSK modulated signals. The system includes two antennas 102, 104 and receiver 106. In this system 100, the two receiver IF channels 108, 110 are sampled by analog-to-digital (A/D) converters 114, 116 at the sample frequency Fs, which is assumed to be greater than twice the information bandwidth of the signal. The sampled data is fed to a correlation processor 118 which performs a discrete correlation of the two data streams. The received signal's autocorrelation function must be distinct and unambiguous over the period D/c which is the maximum delay resolution of the system. The time delay at which the correlation peak occurs is calculated from the sample number at which the correlation peak occurs times the sample period. S1(k) and S2(k) are sampled versions of IF1 and IF2 respectively, as shown in FIG. 4, where k refers to the sample number. Kmax is the sample number k corresponding to the peak of the correlation function of S1 and S2. The discrete correlation R is given by $$R(S1S2)(k)) = \Sigma S1(n)S2(n-k)$$

where the sum is taken over n=−m to m, m is the maximum length of sampled sequences S1 and S2, and n is an index. Kmax is the sample number corresponding to the peak of the correlation function $$R(S1S2(Kmax)) = Max(R(S1S2(k)))$$

The time delay between the two signals is:

$$\Delta T = kmax/Fs$$

The phase difference between the two data streams is derived from the averaged phase differences between the two streams measured at the estimated delay time using samples taken at the best fit to the mid-symbol points in the code.

$$\Delta\phi = (1/n)\Sigma\psi(S1n\hat{n} - S2\hat{n} + kmax)$$

where n^ is the set of mid-symbol sample points, n is the number of samples in n^, and ψ(S1,S2) is the phase difference between the two signals.

The derived values for ΔT and ϕ are used by angle calculator 120 to find θ as discussed above regarding the system 50.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A precision direction finding system responsive to RF signals for determining a precise estimate of an angle of arrival (AOA) of the RF signal relative to a system antenna array, comprising:

first and second antenna elements separated in space;

receiver and processing apparatus responsive to first and second signals received at said first and second antenna elements, said apparatus for determining a frequency of said received signals, for determining a phase difference between corresponding phases of said first and second signals received at said first and second antenna elements, and for determining a time difference of arrival (TDOA) of said respective first and second signals at said first and second antenna elements;

angle calculation apparatus responsive to said phase difference and said frequency for performing a phase interferometry determination of a set of multiple ambiguous estimates of said AOA, for performing a TDOA angle calculation to provide a coarse estimate of said AOA, and for selecting as a precision estimate of said AOA the ambiguous estimate which is closest to said coarse estimate.

2. The system of claim 1 wherein said RF signal is a pulsed signal, and said receiver and processor circuitry includes a receiver which generates first and second detected video envelopes of said first and second received signals, and a leading edge measurement circuit responsive to said first and second video envelopes for determining first and second TOA values, each value representing the TOA of the leading edge of the video envelope referenced to a peak amplitude of the corresponding video envelope.

3. The system of claim 2 wherein said leading edge measurement circuit further performs quantization of said first and second TOA values to a common time reference.

4. The system of claim 1 wherein said RF signal is a frequency shift keyed (FSK) or phase shift keyed (PSK) modulated signal, said receiver and processing apparatus includes a receiver apparatus for providing first and second intermediate frequency (IF) versions of the first and second received signals, first and second analog-to-digital (A/D) converters responsive to said respective first and second IF signal versions to produce digitized first and second data streams, a correlation processor for performing a discrete convolution of said first and second data streams, determining a time delay at which a correlation peak occurs, and determining a phase difference between said first and second data streams.

5. The system of claim 4 wherein said correlation processor determines said phase difference between said first and second data streams as an average phase difference between said first and second data streams measured at said time delay at said correlation peak using samples of said data streams taken at mid-symbol points in said modulation.

6. The system of claim 1 wherein said angle calculation apparatus determines said coarse AOA estimate in accordance with the following relationship:

$$\theta = \sin^{-1}(\Delta Tc/D)$$

where $\theta$ represents the angle of arrival, $\Delta T$ is the TDOA estimate, c is the speed of light, and D is the distance between the first and second antenna elements.

7. The system of claim 1 wherein said angle calculation apparatus determines said set of multiple ambiguous estimates of the AOA in accordance with the following relationship:

$$\theta_{amb} = \arcsin\left[\frac{(\phi + 2\pi m)\lambda}{2\pi D}\right]$$

where m is the ambiguity number, D is the distance between the first and second antenna elements, $\phi$ is the phase difference, and $\lambda$ is the wavelength of the received signals.

8. A method for determining a precise estimate of an angle of arrival (AOA) of received RF signals relative to a antenna array of first and second antenna elements separated in space by a distance D, comprising the steps of:

processing first and second signals at said first and second antenna elements in response to the received RF signals to determine a frequency of said received signals, to determine a phase difference between corresponding phases of said first and second signals received at said first and second antenna elements, and to determine a time difference of arrival (TDOA) of said respective first and second signals at said first and second antenna elements;

calculating a set of multiple ambiguous estimates of said AOA using phase interferometry in response to said phase difference and said frequency;

performing a TDOA angle calculation using said TDOA to provide a coarse estimate of said AOA; and selecting as a precision estimate of said AOA that ambiguous estimate comprising said set which is closest to said coarse estimate.

9. The method of claim 8 wherein said RF signal is a pulsed signal, and said processing step to determine said TDOA includes the step of generating first and second detected video envelopes of said first and second received signals, and using said first and second video envelopes to determine first and second TOA values, each value representing the TOA of the leading edge of the video envelope referenced to a peak amplitude of the corresponding video envelope.

10. The method of claim 9 wherein said processing step to determine said TDOA further includes quantizing said first and second TOA values to a common time reference.

11. The method of claim 8 wherein said RF signal is a frequency shift keyed (FSK) or phase shift keyed (PSK) modulated signal, said processing step further includes providing first and second intermediate frequency (IF) versions of the first and second received signals, converting said first and second IF versions of said received signals into digitized first and second data streams, performing a discrete convolution of said first and second data streams, determining a time delay at which a correlation peak occurs, and determining a phase difference between said first and second data streams.

12. The method of claim 11 wherein said processing step determines said phase difference between said first and second data streams as an average phase difference between said first and second data streams measured at said time delay at said correlation peak using samples of said data streams taken at mid-symbol points in said modulation.

13. The method of claim 8 wherein said step of determining said coarse AOA estimate provides said coarse AOA estimate in accordance with the following relationship:

$$\theta = \sin^{-1}(\Delta Tc/D)$$

where $\theta$ represents the angle of arrival, $\Delta T$ is the TDOA estimate, c is the speed of light, and D is the distance between the first and second antenna elements.

14. The method of claim 8 wherein said step of determining said set of multiple ambiguous estimates of the AOA provides said set in accordance with the following relationship:

$$\theta_{amb} = \arcsin\left[\frac{(\phi + 2\pi m)\lambda}{2\pi D}\right]$$

where m is the ambiguity number, D is the distance between the first and second antenna elements, $\phi$ is the phase difference, and $\lambda$ is the wavelength of the received signals.

* * * * *